United States Patent
Miyanaga et al.

(10) Patent No.: US 10,578,791 B2
(45) Date of Patent: Mar. 3, 2020

(54) LIGHT GUIDE MEMBER AND LIGHT SOURCE UNIT USING THE SAME

(71) Applicant: NS MATERIALS INC., Fukuoka (JP)

(72) Inventors: Akiharu Miyanaga, Fukuoka (JP); Eiichi Kanaumi, Fukuoka (JP); Shingo Kokudo, Fukuoka (JP)

(73) Assignee: NS MATERIALS INC., Fukuoka (JP)

( * ) Notice: Subject to any disclaimer, the term of this patent is extended or adjusted under 35 U.S.C. 154(b) by 0 days.

(21) Appl. No.: 15/522,416

(22) PCT Filed: Oct. 27, 2015

(86) PCT No.: PCT/JP2015/080174
§ 371 (c)(1),
(2) Date: Apr. 27, 2017

(87) PCT Pub. No.: WO2016/072313
PCT Pub. Date: May 12, 2016

(65) Prior Publication Data
US 2017/0329069 A1  Nov. 16, 2017

(30) Foreign Application Priority Data
Nov. 4, 2014  (JP) .................. 2014-224054

(51) Int. Cl.
*F21V 8/00* (2006.01)
*F21V 9/30* (2018.01)
(52) U.S. Cl.
CPC .............. *G02B 6/0026* (2013.01); *F21V 9/30* (2018.02); *G02B 6/0028* (2013.01)

(58) Field of Classification Search
CPC ........ G02B 6/0015; G02B 6/0026; F21V 9/30
See application file for complete search history.

(56) References Cited

U.S. PATENT DOCUMENTS 8,573,827 B2  11/2013  Lee
2010/0271844 A1*  10/2010  Wang ................... G02B 6/0023
362/629

(Continued)

FOREIGN PATENT DOCUMENTS

JP  2010-140846  6/2010
JP  2013-218954  10/2013

(Continued)

OTHER PUBLICATIONS

International Search Report, along with English-language translation thereof, issued in PCT/JP2015/080174 dated Dec. 22, 2015.

(Continued)

*Primary Examiner* — Alexander K Garlen
(74) *Attorney, Agent, or Firm* — Greenblum & Bernstein, P.L.C.

(57) ABSTRACT

To provide a light guide member which has less components than conventional ones and has stable wavelength conversion efficiency; and a light source unit using the light guide member. A light guide member includes: a light guide plate; a receiving space formed in the light guide plate to face a light entrance plane; and a wavelength converting material placed in the receiving space. With the use of the light guide member, the number of components can be reduced and stable wavelength conversion efficiency can be achieved. Further, the production process can be facilitated and the production cost can be reduced.

8 Claims, 5 Drawing Sheets

(56) References Cited

U.S. PATENT DOCUMENTS

| | | | |
|---|---|---|---|
| 2012/0050649 A1* | 3/2012 | Yeo | G02B 6/002 349/65 |
| 2012/0075837 A1 | 3/2012 | Um | |
| 2012/0257414 A1* | 10/2012 | Park | G02B 6/0068 362/611 |
| 2013/0322115 A1* | 12/2013 | Parker | F21V 9/40 362/608 |
| 2014/0036532 A1* | 2/2014 | Lee | G02B 6/0021 362/608 |

FOREIGN PATENT DOCUMENTS

| | | |
|---|---|---|
| JP | 2013-258119 | 12/2013 |
| JP | 2014-116231 | 6/2014 |
| KR | 10-2012-0075015 | 7/2012 |
| TW | 201321847 | 6/2013 |

OTHER PUBLICATIONS

Extended European Search Report issued for European Patent Application No. 15856432.8 dated Jun. 6, 2018.

* cited by examiner

LIGHT GUIDE MEMBER AND LIGHT SOURCE UNIT USING THE SAME

TECHNICAL FIELD

The present invention relates to a light guide member which makes it possible to convert the wavelength of light having entered a light entrance plane, and a light source unit using the light guide member.

BACKGROUND ART

For example, JP 2013-218954 A (PTL 1) below discloses an invention relating to a light emitting device including a light source, a wavelength converting member, a light guide plate, and others.

The wavelength converting member is provided between the light source and the light guide plate, and absorbs light emitted from the light source and then produces light having a wavelength different from the wavelength of the light mitted. In the wavelength converting member; for example, a wavelength converting material is encapsulated in a cylindrical receptacle made of glass or the like. The wavelength converting material includes fluorescent pigment, fluorescent dye, quantum dots, or the like.

CITATION LIST

Patent Literature

PTL 1: JP 2013-218954 A

SUMMARY OF INVENTION

Technical Problem

As described above, a wavelength converting member is conventionally provided separately from a light guide plate. This is likely to result in misalignment between the wavelength converting member and the light guide plate. Further, providing the wavelength converting member separately from the light guide plate increases the number of components. In addition, it is difficult to stably and accurately fill the thin cylindrical receptacle shown in PTL 1 with a wavelength converting material.

Thus, the conventional structure suffers from great variation in the wavelength conversion efficiency, increased cost, and a complicated production process.

The present invention is made in consideration of the above, in particular with a view to providing a light guide member which has less components than conventional ones and has stable wavelength conversion efficiency; and a light source unit using the light guide member.

Solution to Problem

A light guide member of the present invention includes: a light guide plate; a receiving space formed in the light guide plate to face a light entrance plane; and a wavelength converting material placed in the receiving space.

In the present invention, a receiving space is located in a light guide plate to face a light entrance plane, and a wavelength converting material is placed in the receiving space. Thus, the light guide member of the present invention serves as both a light guide plate and a wavelength converter. Accordingly, the above structure makes it unnecessary to align a light guide plate with a wavelength converting member unlike when a light guide plate and a wavelength converting member are provided separately as in the prior art; and stable wavelength conversion efficiency can be achieved. Further, the number of components can be reduced in the present invention compared to the prior art. Further, since a large-area light guide plate is provided with a receiving space for a wavelength converting material, the wavelength converting material can be more easily placed in the receiving space as compared to the case where a wavelength converting material is introduced into a thin cylindrical receptacle as in the prior art, thus facilitating the production process. Further, the production cost can be reduced due to the reduction in the number of components and the facilitation of the production process.

In the present invention, the wavelength converting material preferably contains quantum dots. In the present invention, a resin composition containing the wavelength converting material is preferably provided in the receiving space.

Further, in the present invention, a resin composition containing the wavelength converting material can be injected into the receiving space. Alternatively, a resin composition containing the wavelength converting material can constitute a molding, and the molding can be placed in the receiving space.

In the present invention, a colored layer is preferably formed at least in a region other than the light entrance plane and a light exit plane of the light guide plate. This enables suitable and efficient color conversion compared to the prior art and allows light having a desired color to be obtained from the light exit plane of the light guide member.

A light source unit of the present invention includes one of the above light guide members; and a light emitting element. In the present invention, it is preferable that the light emitting element is integrally attached to the light entrance plane of the light guide member. This allows a light source unit in which a light guide member and a light emitting element are integrated to be mounted on a display device or the like, with no need to align the light guide member and the light emitting element. This simplified assembling leads to improved working efficiency.

Advantageous Effects of Invention

With the use of a light guide member of the present invention, the number of components can be reduced compared to the prior art and stable wavelength conversion efficiency can be achieved. Further, the present invention can seek to facilitate the production process and reduce the production cost.

BRIEF DESCRIPTION OF DRAWINGS

In the accompanying drawings.

DESCRIPTION OF EMBODIMENTS

Embodiments of the present invention (hereinafter simply referred to as "embodiments") will now be described in detail. The present invention is not limited to the following embodiments and can be variously altered without departing from the spirit of the present invention.

Figure 1:
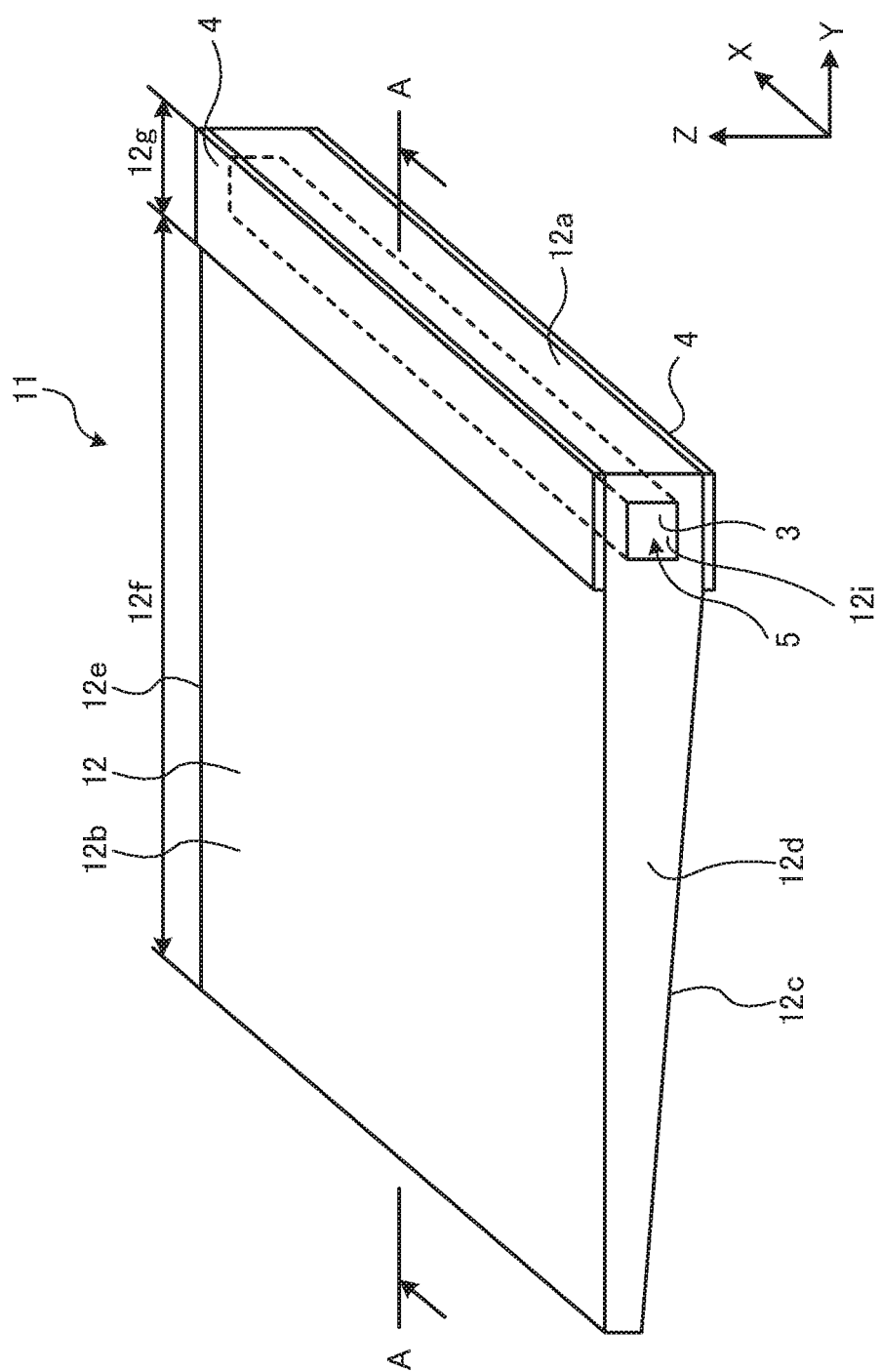
FIG. 1 is a perspective view of a light guide member exemplifying a first embodiment of the present invention.

FIG. 1 is a perspective view of a light guide member exemplifying a first embodiment of the embodiments. The directions X, Y, and Z shown in FIG. 1 are orthogonal to each other. The direction Z indicates the height direction in the direction vertical to the paper plane, the direction X indicates the depth direction on the paper plane, and the direction Y indicates the lateral direction on the paper plane.

Figure 3:
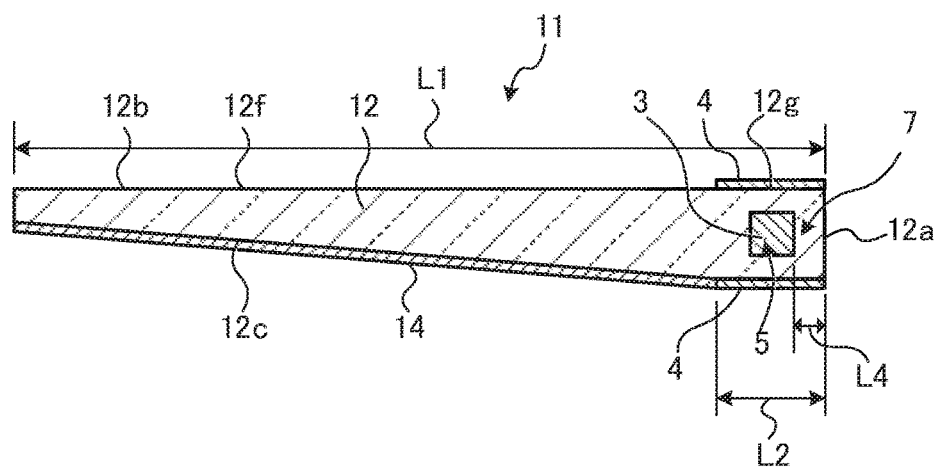
FIG. 3 is a longitudinal sectional view of the light guide member shown in FIG. 1, taken along line A-A in the height direction (Z) and viewed in the direction of the arrow (X)

FIG. 3 is a longitudinal sectional view of the light guide member shown in FIG. 1, taken along line A-A in the height direction (Z) and viewed in the direction of the arrow (X).

As shown in FIG. 1 and FIG. 3, a light guide member 11 has a light guide plate 12, a receiving space 5 formed in the light guide plate 12 inside the light entrance plane 12a, and a wavelength converting material 3 placed in the receiving space 5.

As shown in FIG. 1, the light guide plate 12 is substantially shaped like a plate, and one of the side surfaces of the light guide plate 12 serves as a light entrance plane 12a. The term "side surfaces" here refer to the right-hand side surface and the left-hand side surface in the drawing. Further, as shown in FIG. 1, the light guide plate 12 has a top surface (upper surface) 12b, a bottom surface (lower surface) 12c, a front surface 12d, and a rear surface 12e. The top surface 12b and the bottom surface 12c face each other and are substantially perpendicular to the side surfaces, the front surface 12d, and the rear surface 12e. Meanwhile, the front surface 12d and the rear surface 12e face each other and are substantially perpendicular to the side surfaces, the top surface 12b, and the bottom surface 12c. Specifically, the light entrance plane 12a is a plane parallel to an X-Z plane and the top surface 12b is a plane parallel to an X-Y plane. Part of the bottom surface 12c closer to the light entrance plane 12a is parallel to an X-Y plane, whereas the other part thereof farther from the light entrance plane 12a is somewhat inclined from an X-Y plane. Meanwhile, the front surface 12d and the rear surface 12e are planes parallel to a Y-Z plane. Alternatively, the entire bottom surface 12c may be parallel to an X-Y plane; or the entire bottom surface 12c may be somewhat inclined from the X-Y plane. Note that the shape of the light guide plate 12 is not specifically limited.

The surface 12b of the light guide plate 12 shown in FIG. 1 serves as a light exit plane 12f. Specifically, a region substantially facing the wavelength converting material 3 serves as a wavelength conversion region 12g, and part of the top surface 12b that is farther than the wavelength converting material 3 when viewed from the light entrance plane 12a serves as the light exit plane 12f. The bottom surface 12c facing the light exit plane 12f is a plane somewhat inclined from an X-Y plane.

As shown in FIG. 1, the receiving space 5 is a space extending from the front surface 12d to the rear surface 12e; alternatively, the receiving space 5 may be open only on the front surface 12d side and may be closed on the rear surface 12e side. Note however that the receiving space 5 preferably penetrates through the light guide member. The receiving space 5 is positioned inside the light entrance plane 12a and is positioned inside the top surface 12b and the bottom surface 12c. However, part of the receiving space 5 may reach the light entrance plane 12a, the top surface 12b, or the bottom surface 12c.

The receiving space 5 is formed closer to the light entrance plane 12a of the light guide plate 12 in the lateral direction on the paper plane (Y). This allows the wavelength conversion region 12g to be formed only in a small limited area on the light entrance plane 12a side of the light guide plate 12.

As shown in FIG. 3, when the length dimension of the light guide plate 12 in the lateral direction on the paper plane (Y) is L1, the length dimension of the wavelength conversion region 12g is L2, wherein L2/L1 is approximately 0.01 to 0.2. Accordingly, L1-L2 corresponds to the area of the light exit plane 12f.

As shown in FIG. 1 and FIG. 3, the wavelength converting material 3 is provided in the receiving space 5. The wavelength converting material 3 preferably contains quantum dots. Fluorescent pigment, fluorescence dye or the like other than quantum dots may be used for the wavelength converting material 3; however, excellent wavelength conversion characteristics can be obtained when the wavelength converting material 3 contains quantum dots.

A resin composition containing the wavelength converting material 3 is preferably provided in the receiving space 5. Examples of resins that can be used include: polypropylene, polyethylene, polystyrene, AS resin, ABS resin, methacrylate resin, polyvinyl chloride, polyacetal, polyamide, polycarbonate, modified polyphenylene ether, polybutylene terephthalate, polyethylene terephthalate, polysulfone, polyethersulfone, polyphenylene sulfide, polyamide-imide, polymethylpentene, liquid crystal polymers, epoxy resin, phenol resin, urea formaldehyde resin, melamine resin, epoxy resin, diallyl phthalate resin, unsaturated polyester resin, polyimide, polyurethane, silicone resin, and mixtures thereof. The wavelength converting material 3 is dispersed in the resin.

Further, the refractive index of the resin in which the wavelength converting material 3 is dispersed is preferably lower than the refractive index of the light guide plate 12. The refractive index of the sodium D line through a silicone resin at 23° C. is for example, 1.52 for SCR1016 manufactured by Shin-Etsu Chemical Co., Ltd.; 1.55 for A2045 manufactured by Daicel Corporation; 1.41 for KER-2500 manufactured by Shin-Etsu Chemical Co., Ltd.; and 1.41 for A1080 manufactured by Daicel Corporation. Meanwhile, the refractive index of the sodium D line through an epoxy resin at 23° C. is 1.51 and 1.50 for CELVENUS WO917 and CELVENUS WO925 both manufactured by Daicel Corporation, respectively. On the other hand, when the light guide plate 12 is formed, for example, from an acrylic resin, the refractive index of the light guide plate 12 is approximately 1.49 in the case of a typical acrylic resin. When the resin in which the wavelength converting material 3 is dispersed, and the material of the light guide plate 12 are suitably selected, the refractive index of the resin can be made lower than the refractive index of the light guide plate 12. For example, a silicone resin A1080 or KER-2500 having a refractive index of 1.41 can be used for the resin in which the wavelength converting material 3 is dispersed, whereas the light guide plate 12 can be formed from an epoxy resin having a refractive index of 1.49. This causes part of light having entered the wavelength conversion layer 3 to be totally reflected at side wall portions of the light guide plate 12 facing the receiving space 5, because the angle of incidence is larger on the low refractive index medium side than on the angle of incidence on the high refractive index medium side. Thus, the amount of light leaking from the sides of the light guide plate 12 can be reduced, thereby increasing color conversion efficiency and light emission intensity.

Although the structure and the material of the quantum dots contained in the wavelength converting material 3 are not limited; for example, a quantum dot in this embodiment can have a core consisting of a semiconductor particle and a shell part covering the circumference of the core. A material that is used for the core is, for example, but not limited to CdSe. For example, CdS, CdSe, ZnS, ZnSe, InP, CdTe, or a composite thereof can be used.

The quantum dots include, for example, two types of quantum dots having an absorption (excitation) wavelength of 460 nm (blue): those which have a fluorescence wavelength of approximately 520 nm (green) and those which have a fluorescence wavelength of approximately 660 nm (red). Accordingly, when blue light enters the light entrance plane 12a, each quantum dot converts part of the blue light into green or red light. Thus, white light can be obtained from the light exit plane 12f.

The bottom surface 12c facing the light exit plane 12f is a light reflecting surface. Light having entered the light entrance plane 12a and traveled through the wavelength conversion region 12g reflects off the bottom surface 12c and is output to the outside from the light exit plane 12f. In FIG. 3, a reflective layer 14 is provided on the bottom surface 12c facing the light exit plane 12f. Alternatively, the bottom surface 12c can be processed to serve as a reflective surface instead of providing the reflective layer 14.

Further, in FIG. 3, the top surface 12b and the bottom surface 12c of the wavelength conversion region 12g are provided with colored layers 4. The colored layers 4 may be formed at least in a region other than the light entrance plane 12a and the light exit plane 12f. The term "colored layer" refers to a non-transparent layer that is colored in any color including white. The colored layers 4 are preferably made of paint, ink, or tape. The color of the colored layers 4 is preferably, but not limited to, white. Accordingly, the color layers 4 can simply be formed by coating the top surface 12b and the bottom surface 12c with white paint or white ink or by sticking white tape to the top surface 12b and the bottom surface 12c.

This can prevent light leak, where light having entered the light entrance plane 12a exits through side areas 7 between the receiving space 5 and the top surface 12b and between the receiving space 5 and the bottom surface 12c, enable suitable and efficient color conversion, and provide light having a desired color from the light exit plane 12f. Note that the colored layers 4 are not necessarily formed.

As described above, in this embodiment, the receiving space 5 is positioned in the light guide plate 12 to face the light entrance plane 12a, and the wavelength converting material 3 is placed in the receiving space 5. Thus, the light guide member 11 of this embodiment serves as both a light guide plate and a wavelength converter, making it unnecessary to provide a light guide plate and a wavelength conversion member separately as in the prior art.

Accordingly, in this embodiment, it is not necessary to align a light guide plate with a wavelength converting member, and stable wavelength conversion efficiency can be achieved. In a configuration in which a light guide plate and a wavelength converting member are separately provided and then assembled as in the prior art, an interface is formed between the light guide plate and the wavelength converting member, likely resulting in diffusion or reflection of light at the interface. In contrast, in this embodiment, light having entered the light entrance plane 12a is guided from the wavelength conversion region 12g to the light exit plane 12f through the integral light guide plate 12. Consequently, stable wavelength conversion efficiency can be obtained and the light intensity can be increased.

Moreover, in this embodiment, since a light guide plate is integral with a wavelength converting member, the number of components can be reduced compared to the prior art. Further, in this embodiment, the wavelength converting material 3 is placed in the receiving space 5 for a wavelength converting material, provided in the large-area light guide plate 12, so that the production process can be facilitated compared to the case where a thin cylindrical receptacle filled with a wavelength converting material is placed as in the prior art. Further, the production cost can be reduced due to a smaller number of components and the facilitation of the production process.

Figure 7:
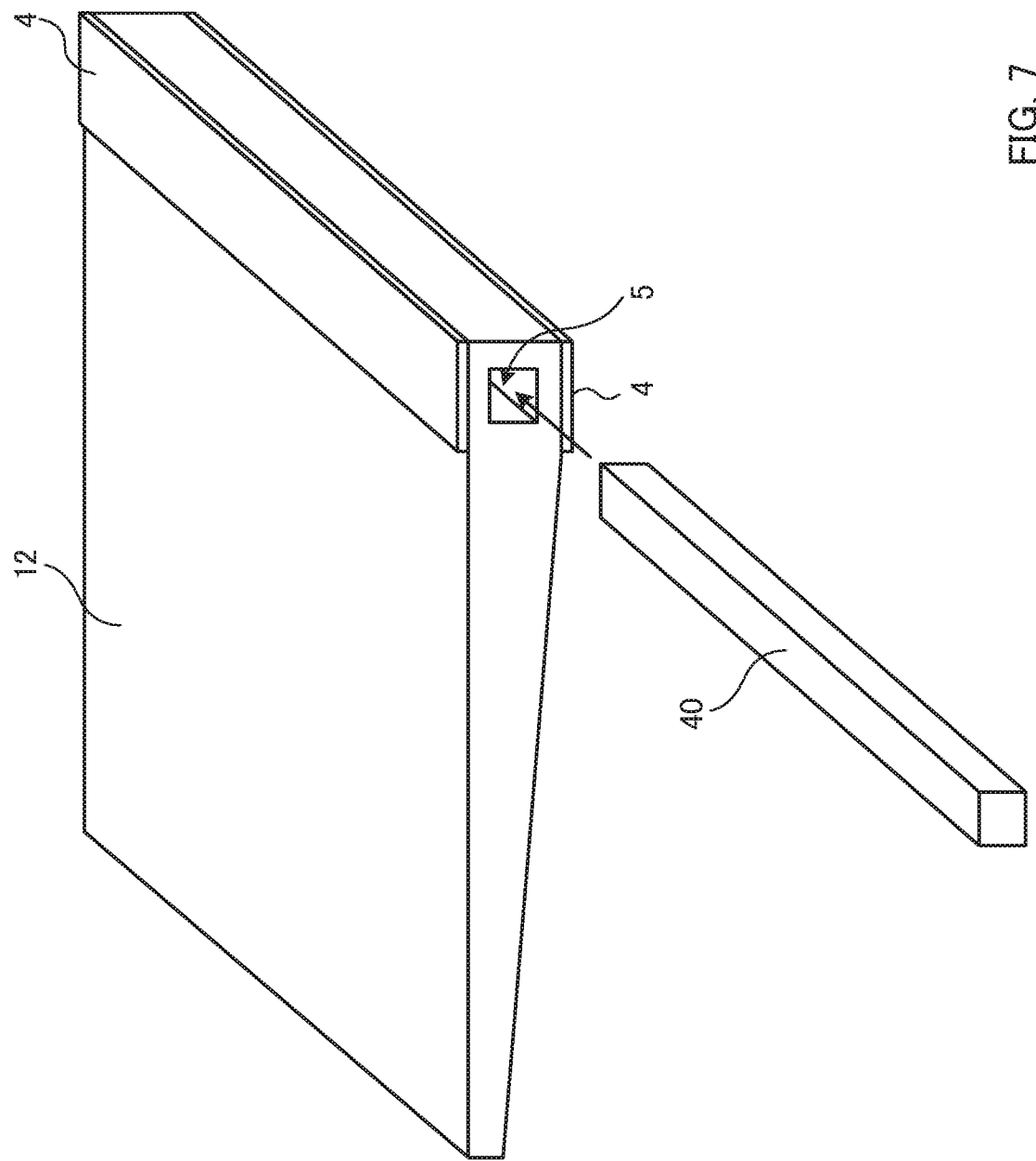
FIG. 7 is a perspective view illustrating a step of inserting a molding containing a wavelength converting material into a receiving space of a light guide member of the embodiments in the production process.

In this embodiment, a resin composition containing the wavelength converting material 3 may be injected into the receiving space 5; alternatively, a resin composition containing the wavelength converting material 3 may constitute a molding, and the molding can be placed in the receiving space 5. A configuration in which a resin composition containing the wavelength converting material 3 is injected into the receiving space 5 is more likely to leave air bubbles in the resin composition containing the wavelength converting material 3 compared to the case where a molding is inserted into the receiving space 5. Therefore, a configuration in which a molding 40 formed from a resin composition containing the wavelength converting material 3 is previously molded by injection molding or the like and the molding 40 is inserted into the receiving space 5 as shown in FIG. 7 is preferred, since air bubbles can be prevented from being formed. The molding 40 may be formed using a method such as extrusion molding, blow molding, thermoforming, compression molding, calendaring, blown film extrusion, casting, or the like other than injection molding.

The molding 40 can be formed to be approximately as large as the receiving space 5 or slightly larger than the receiving space 5, and the molding 40 can be press fit into the receiving space 5. This allows the outer periphery of the molding 40 to be in close contact with the wall surfaces defining the receiving space 5. Alternatively, the molding 40 may be formed to be slightly smaller than the receiving space 5, and the molding 40 may be inserted into the receiving space 5 with an adhesive being applied to the outer periphery of the molding 40. This allows the outer periphery of the molding 40 to be in close contact with the wall surfaces defining the receiving space 5 with the adhesive layer therebetween. In this embodiment, the receiving space 5 is provided in the light guide plate 12 of large volume and the molding 40 is inserted into the receiving space 5, which makes it easier to insert the molding 40 compared to the case of using a thin cylindrical receptacle as in the existing techniques. In addition, the above configuration can prevent part of a member (light guide plate 12 in this embodiment) having the receiving space 5 from suffering from fracture due to press fit of the molding 40 or the like.

Figure 2:
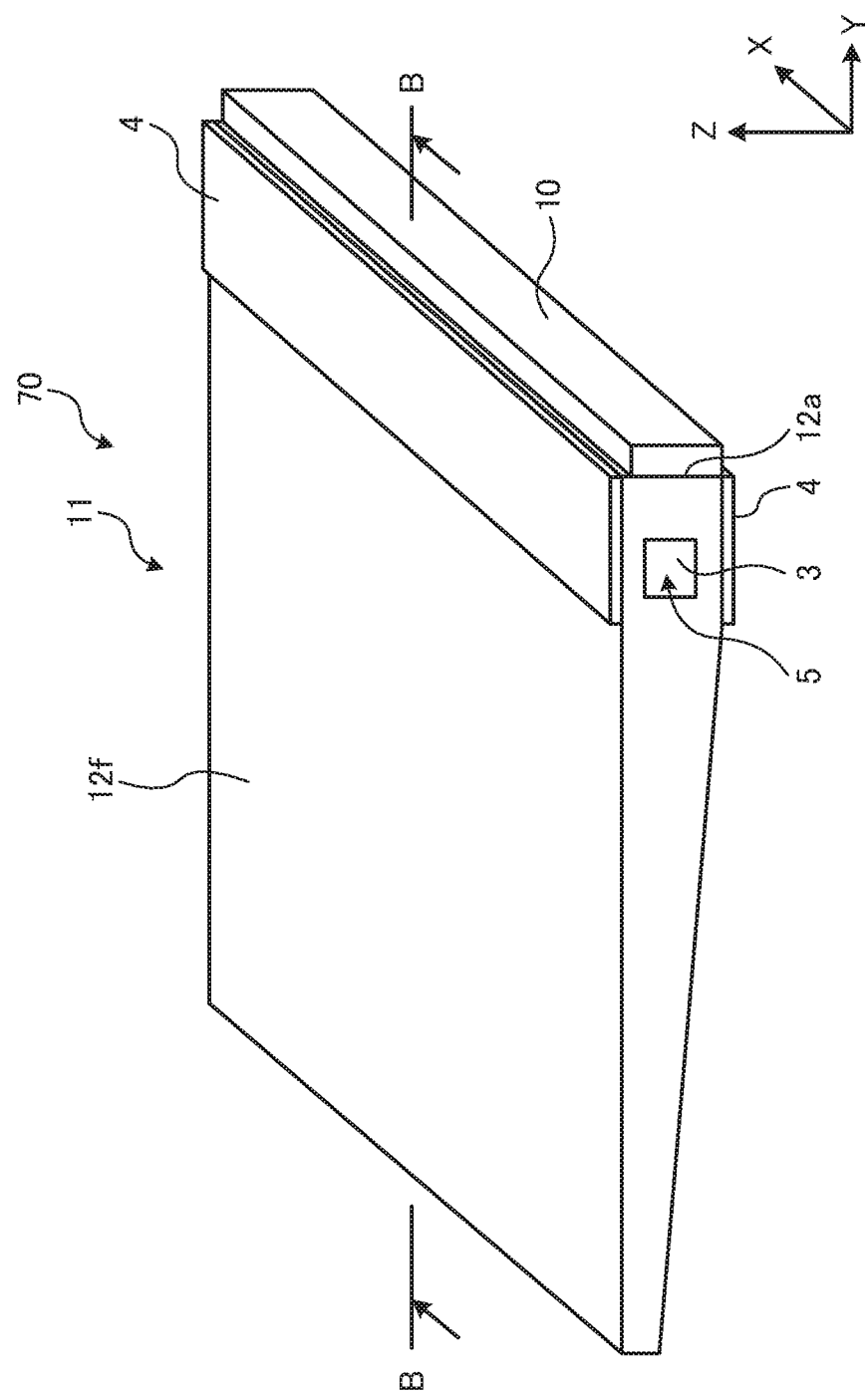
FIG. 2 is a perspective view of a light guide member exemplifying a second embodiment of the embodiments, and a light source unit using the light guide member.
Figure 4:
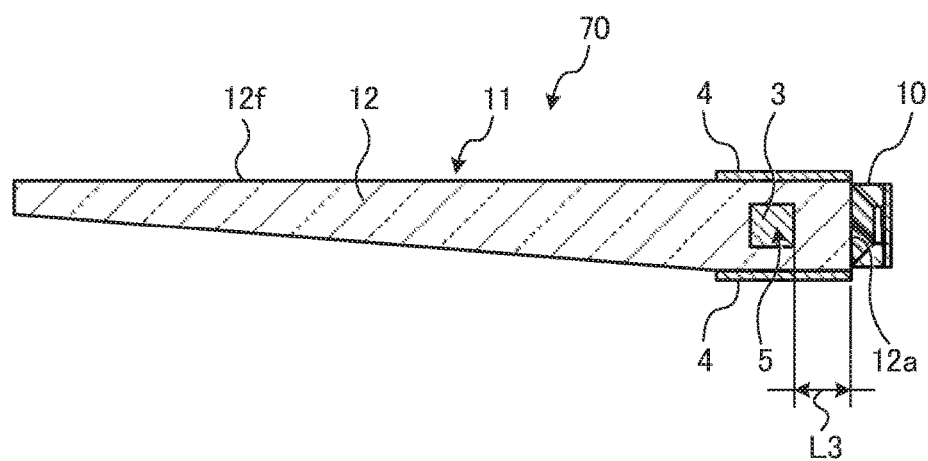
FIG. 4 is a longitudinal sectional view of the light source unit shown in FIG. 2, taken along line B-B in the height direction (Z) and viewed in the direction of the arrow (X)

FIG. 2 is a perspective view of a light guide member exemplifying a second embodiment of the embodiments, and a light source unit using the light guide member. FIG. 4 is a longitudinal sectional view of the light source unit shown in FIG. 2, taken along line B-B in the height direction (Z) and viewed in the direction of the arrow (X). Corresponding parts in FIG. 2 and FIG. 4 are denoted by the same reference numerals as in FIG. 1 and FIG. 3.

The light guide member 11 shown in FIG. 2 and FIG. 4 is configured to have a light guide plate 12, a receiving space 5, and a wavelength converting material 3 as with the light guide member 11 shown in FIG. 1 and FIG. 3; whereas, as shown in FIG. 4, a distance L3 between the light entrance plane 12a and the receiving space 5 is longer than a distance L4 between the light entrance plane 12a and the receiving space 5 shown in FIG. 3. For example, the distance L3 is approximately 1 mm to 8 mm.

In the embodiment shown in FIG. 2 and FIG. 4, the light emitting element (LEDs) 10 is integrally attached to the light entrance plane 12a of the light guide member 11. The light emitting element 10 and the light guide member 11 compose a light source unit 70.

It has been found that a short distance between the wavelength converting material 3 placed in the receiving space 5 and the light emitting element 10 causes blackening in part of the wavelength converting material 3 facing the light emitting element 10, when the wavelength converting material 3 contains quantum dots. The blackening occurs because light or heat or both from the light emitting element 10 affect the quantum dots.

To address this problem, in the structure of FIG. 2 and FIG. 4, the distance L3 between the wavelength converting material 3 and the light entrance plane 12a is made longer to keep the wavelength converting material 3 at a distance from the light emitting element 10, thereby suppressing the occurrence of blackening. This allows the wavelength converting material 3 to be suitably distant from the light emitting element 10 even when the light emitting element 10 is integrally attached to the light entrance plane 12a. Thus, the occurrence of blackening can be suppressed compared to the prior art, and the light source unit 70 can be assembled in a simple manner.

Figure 5:
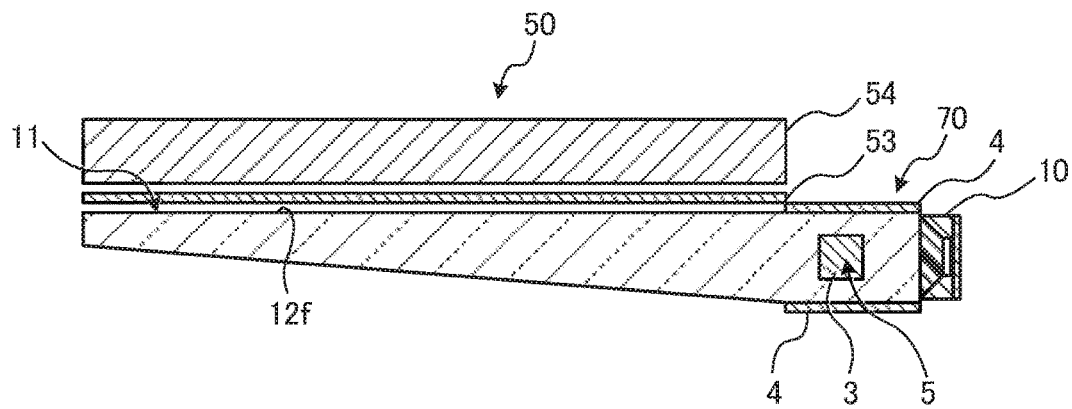
FIG. 5 is a longitudinal sectional view of a display device using the light source unit shown in FIG. 4.

FIG. 5 is a longitudinal sectional view of a display device using the light source unit shown in FIG. 4. As shown in FIG. 5, a display device 50 is configured to have a light emitting element 10 (LEDs), a light guide member 11, and a display area 54 such as a liquid crystal display facing the light exit plane 12f of the light guide member 11. In FIG. 5, a diffuser panel 53, etc. are provided between the display area 54 and the light guide member 11. Note that the diffuser panel 53 is not necessarily provided. The light source unit 70 placed on the back of the display area 54 serves as a back light unit.

Figure 6:
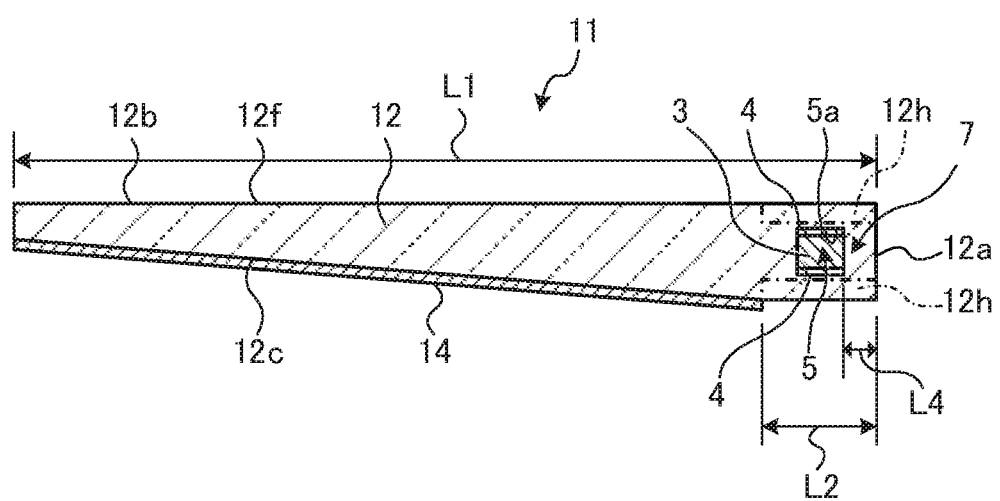
FIG. 6 is a longitudinal sectional view showing a different structure from FIG. 3.

In FIG. 3 to FIG. 5, the colored layers 4 are formed on the external surfaces of the light guide plate 12; alternatively, the colored layers 4 can be formed on wall surfaces 5a defining the receiving space 5 as shown in FIG. 6. Alternatively, as shown in FIG. 6, side portions 12h of the light guide plate 12 between the side surfaces of the light guide plate 12 and the receiving space 5 themselves can constitute the colored layers 4. In that case, the light guide plate 12 is formed by double injection molding, in which case, a colored resin is used for parts to be the side portions 12h of the light guide plate 12. Alternatively, the side portions 12h of the light guide plate 12 can be joined to the other components, for example, by bonding to obtain the light guide plate 12.

In addition, both ends 12i of the light guide plate 12, having the wavelength converting material 3 shown in FIG. 1 may be provided with the colored layers 4. This can suppress light leak from the ends of the light guide plate 12, leading to suitable and highly efficient color conversion compared to the prior art. Note that the reflective layer 14 shown in FIG. 3, etc. may be, for example, shaped like dots.

In this embodiment, backlight obtained through efficient wavelength conversion from the light source unit 70 can illuminate the display area 54, thereby improving the display characteristics of the display device 50.

INDUSTRIAL APPLICABILITY

According to the present invention, a light source unit, a display device, and the like using a light guide member in which a wavelength converting material is placed in a receiving space provided in a light guide plate can be obtained. Since stable wavelength conversion efficiency can be achieved by a light guide member of the present invention, a light source unit, a display device, and the like using a light guide member of the present invention can be of high quality. Further, the number of components of the light guide member can be reduced compared to the prior art, and the production cost of the light guide member, light source unit, and display device can be reduced accordingly compared to the prior art.

This application is based on Japanese patent application No. 2014-224054 filed on Nov. 4, 2014, the content of which is hereby incorporated in its entirety.

The invention claimed is:

1. A light guide member comprising: a light guide plate including a first surface, a second surface that opposes the first surface, and a light entrance surface that connects the first surface with the second surface; a receiving space formed in the light guide plate, the receiving space having walls defined by inner sides of the light entrance surface, the first surface, and the second surface; and a resin composition comprising a wavelength converting material and a dispersion resin that disperses the wavelength converting material, the resin composition provided in the receiving space, wherein the wavelength converting material contains quantum dots, the resin composition is molded and directly contacts the walls of the receiving space, the first surface of the light guide plate includes a first wavelength conversion region opposing the resin composition and a light exit surface, the light exit surface being provided farther from the light entrance surface than the first wavelength conversion region, the second surface of the light guide plate includes a second wavelength conversion region opposing the resin composition and a light reflection surface, the light reflection surface being provided farther from the light entrance surface than the second wavelength conversion region, a first colored layer is on the first surface in the first wavelength conversion region, a second colored layer is on the second surface in the second wavelength conversion region, and a reflector is on the light reflection surface.

2. The light guide member according to claim 1, wherein the resin composition comprising the wavelength converting material is injection molded.

3. The light guide member according to claim 1, wherein the resin composition comprising the wavelength converting material constitutes a molding, and the molding is placed in the receiving space.

4. A light source unit comprising: the light guide member according to claim 1; and a light emitting element.

5. The light source unit according to claim 4, wherein the light emitting element is integrally attached to the light entrance surface of the light guide member.

6. The light guide member according to claim 1, wherein a volume of the light guide member defined by the first wavelength conversion region of the first surface, the light entrance surface, the second wavelength conversion region of the second surface, and a plane interconnecting the first wavelength conversion region of the first surface and the second wavelength conversion region of the second surface is a rectangular prism, and
the light reflection surface of the second surface is inclined relative to the light exit surface of the first surface.

7. The light guide member according to claim 6, wherein a volume of the light guide member defined by the light reflection surface of the second surface, the light exit surface of the first surface, and planes interconnecting the light reflection surface of the second surface and the light exit surface of the first surface is a trapezoidal prism.

8. The light guide member according to claim 6, wherein a ratio of a length of the light exit surface of the first surface to a length of the first wavelength conversion region of the first surface is approximately 0.01 to 0.2.

* * * * *